United States Patent
Biskeborn et al.

(10) Patent No.: US 9,570,097 B1
(45) Date of Patent: Feb. 14, 2017

(54) TAPE HEAD WITH WRITE POLE HAVING MULTIPLE LAYERS SUPERIMPOSED IN A DIRECTION PERPENDICULAR TO THE CONTACT PLANE

(71) Applicant: International Business Machines Corporation, Armonk, NY (US)

(72) Inventors: Robert G. Biskeborn, San Jose, CA (US); Johan Engelen, Rueschlikon (CH); Mark A. Lantz, Rueschlikon (CH); Hugo E. Rothuizen, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/042,446

(22) Filed: Feb. 12, 2016

(51) Int. Cl.
G11B 5/31 (2006.01)
G11B 5/187 (2006.01)
G11B 5/008 (2006.01)
G11B 5/127 (2006.01)

(52) U.S. Cl.
CPC ......... G11B 5/1871 (2013.01); G11B 5/00813 (2013.01); G11B 5/1274 (2013.01); G11B 5/313 (2013.01); G11B 5/3183 (2013.01)

(58) Field of Classification Search
CPC ..... G11B 5/1274; G11B 5/1278; G11B 5/187; G11B 5/313; G11B 5/3183
USPC ........................................ 360/125.08, 125.35
See application file for complete search history.

(56) References Cited

U.S. PATENT DOCUMENTS

| | | | |
|---|---|---|---|
| 6,198,607 B1* | 3/2001 | Cain | G11B 5/1278 360/246.1 |
| 6,822,829 B2 | 11/2004 | Minor et al. | |
| 7,609,478 B2 | 10/2009 | Han et al. | |
| 8,451,555 B2* | 5/2013 | Seigler | G11B 5/02 360/125.01 |
| 8,553,360 B2 | 10/2013 | Hong | |
| 2005/0264945 A1* | 12/2005 | Krounbi | G11B 5/3163 360/125.35 |
| 2007/0188917 A1 | 8/2007 | Kane et al. | |
| 2007/0297089 A1* | 12/2007 | Dugas | G11B 5/31 360/119.05 |

(Continued)

*Primary Examiner* — Jefferson Evans
(74) *Attorney, Agent, or Firm* — Harrington & Smith

(57) ABSTRACT

A tape head, configured to contact a magnetic tape, at the level of a contact plane, for writing to the tape, in operation is provided. The tape head includes a transducer, the latter being a write element, configured to write to the magnetic tape, in operation. The transducer includes a layered write pole, the latter comprising a set of two or more superimposed layers of distinct materials, the layers superimposed in a direction perpendicular to the contact plane. A saturation magnetization of each of two material layers of the set is between 1.0 to 2.3 Tesla. A contrast between the saturation magnetizations of the two material layers of the set is between 32% and 130%, the contrast defined as 100× ($B_{s,max}/B_{s,min}-1$), where $B_{s,max}$ and $B_{s,min}$ respectively denote a largest one and the smallest one of the saturation magnetizations of the two material layers of the set.

17 Claims, 2 Drawing Sheets

(56) References Cited

U.S. PATENT DOCUMENTS

| | | | | |
|---|---|---|---|---|
| 2008/0239559 A1* | 10/2008 | Goker | .................... | G11B 5/584 |
| | | | | 360/77.12 |
| 2009/0262456 A1* | 10/2009 | Dugas | ................ | G11B 5/00826 |
| | | | | 360/110 |
| 2010/0321824 A1* | 12/2010 | Dugas | .................... | G11B 5/265 |
| | | | | 360/119.06 |
| 2013/0286504 A1* | 10/2013 | Rothermel | ........... | G11B 5/1272 |
| | | | | 360/111 |
| 2014/0078619 A1* | 3/2014 | Song | .................... | G11B 5/1278 |
| | | | | 360/125.03 |
| 2014/0169146 A1* | 6/2014 | Yin | ...................... | G11B 5/1278 |
| | | | | 369/13.33 |
| 2016/0275970 A1* | 9/2016 | Sasaki | ................... | G11B 5/3116 |

\* cited by examiner

TAPE HEAD WITH WRITE POLE HAVING MULTIPLE LAYERS SUPERIMPOSED IN A DIRECTION PERPENDICULAR TO THE CONTACT PLANE

BACKGROUND

The invention relates in general to the field of tape heads and apparatuses equipped with tape heads for writing to (and reading from) a magnetic tape.

Various data storage media or recording media such as magnetic tape, magnetic disks, optical tape, optical disks, holographic disks or cards, and the like are known which allow for storage and retrieval of data. In particular, in magnetic media, data are typically stored as magnetic transitions, i.e., they are magnetically recorded in the magnetic layer of the media. The data stored is usually arranged in data tracks. A typical magnetic storage medium, such as a magnetic tape, usually includes several data tracks. Data tracks may be written and read individually, or sets of data tracks may be written and read in parallel depending. Transducer (read/write) heads are positioned relative to the data tracks to read/write data along the tracks. To this aim, a tape drive head must locate each data track and accurately follow its path. To achieve this, servo techniques have been developed which allow for a precise positioning of the head relative to the data tracks. One such technique makes use of servo patterns, that is, patterns of signals or recorded marks on the medium, which are tracked by the head. The servo patterns are recorded on the recording medium such as to provide a position reference for the data tracks. In other words, a servo reader reads a servo pattern, which is then interpreted by a servo channel into a position error signal (PES). The latter is then used to adjust the distance of the servo head relative to the servo pattern and thereby ensure a proper positioning of the transducers with respect to the set of data tracks.

Continued progress in recording areal densities is contingent on the ability to ensure optimal write quality, i.e., to imprint the media so as to maximize the readback signal-to-noise ratio for otherwise fixed recording conditions (e.g., material properties of the media, reader element, and recording geometry). Features of the imprint which influence this quality are notably: the degree of saturation of the media between transition walls, the shape of the transition walls (straight, vertical walls are preferred to curved or inclined transitions), and the sharpness of the transition wall.

SUMMARY

According to a first aspect, a tape head is provided. The tape head is configured to contact a magnetic tape at the level of a contact plane, for writing to the tape, in operation. To that aim, the tape head comprises at least one transducer (a write element). The transducer comprises a layered write pole with a set of two or more superimposed layers of distinct materials. These layers are superimposed in a direction perpendicular to the contact plane. The saturation magnetization $B_s$ of each of two material layers of the set is between 1.0 to 2.3 Tesla. Still, a contrast between the saturation magnetizations of said two material layers is between 32% and 130%. The contrast (in percent) is defined as $100 \times (B_{s,max}/B_{s,min} - 1)$, where $B_{s,max}$ and $B_{s,min}$ respectively denote the largest one and the smallest one of the saturation magnetizations of said two material layers.

According to another aspect, the invention is embodied as a tape head apparatus for recording or reproducing multi-track tapes, comprising a tape head as herein described.

Devices and apparatuses embodying the present invention will now be described, by way of non-limiting examples, and in reference to the accompanying drawings.

BRIEF DESCRIPTION OF SEVERAL VIEWS OF THE DRAWINGS

FIG. 2 illustrates imprinted transition shapes in the vicinity of the write gap; FIG. 3 further compares imprints as obtained for various compositions for the two topmost layers of a write pole.

Figure 1:
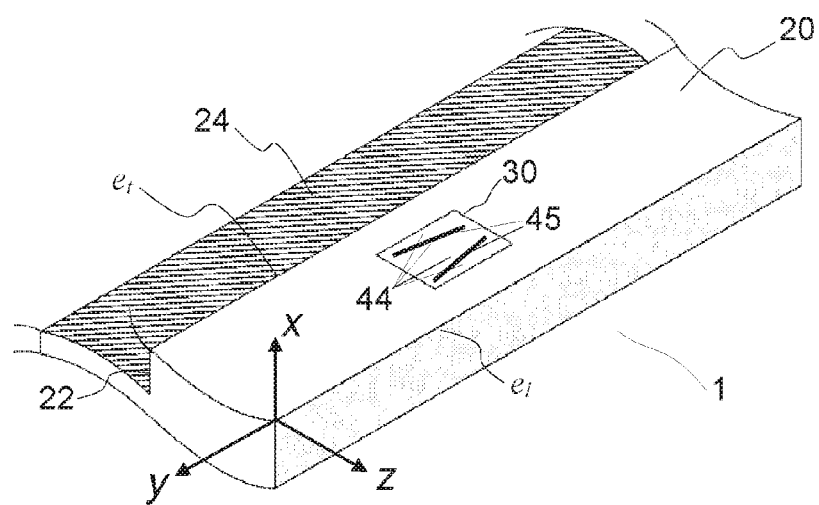
FIG. 1 is a 3D view of a planar tape head (a servo writer), according to embodiments.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION OF EMBODIMENTS OF THE INVENTION

For the purpose of the following description, the shape of the transition imprinted in a magnetic recording media is related to the intersection of the media volume with the "write bubble", i.e., a specific magnitude contour of the write field (a scalar quantity) generated in the vicinity of the write gap between write poles. The write field itself is derived from vector components of the magnetic field H and from remanence curves of the media, see FIG. 2. The write bubble expands conformally outwards from the gap region as the write coil current is ramped up, slowing abruptly when the material of the poles or yokes saturate.

As recording technology matures and moves towards higher coercivity media and smaller write gaps, it becomes increasingly difficult to optimize all desirable features of the imprint simultaneously. In particular, writing good quality servo patterns requires driving the poles into saturation (in order to ensure uniformity across the lateral full extent of the pattern). As it can be realized, this precludes the possibility of adjusting the write bubble size by scaling back the drive current. Similarly, and independently of whether one is writing servo or data patterns, higher coercivity media require utilizing pole materials with higher saturation magnetization and also driving these poles into saturation in order to be able to fully saturate the media layer through its entire thickness. This also precludes scaling back the drive current to adjust the write bubble shape.

Thus, and as it may be realized, the shape and sharpness of the imprinted transition wall may not be optimal for a given media coercivity. Accordingly, a means of controlling the shape of the write bubble other than via the magnitude of the drive current is desirable.

An embodiment is now described (in reference to FIGS. 1-3), which concerns a tape head 1, configured to contact a magnetic tape 10, at the level of a contact plane (y, z), for writing to the tape 10, in operation. Basically, the tape head 1 comprises a transducer 30 (FIG. 1), which is a write element, i.e., an element configured to write to the magnetic tape 10, in operation. The transducer 30 notably comprises a write pole 40 (FIG. 2), i.e., the top pole, which may itself comprise several elements 44.

Interestingly, the transducer 30 comprises a set of two or more superimposed layers 41-43 of distinct materials. The layers 41-43 are superimposed in a direction x perpendicular to the contact plane (y, z). In embodiments described herein, it is proposed to leverage the distinct layers, which comprise materials having different magnetic characteristics (and in particular distinct saturation magnetizations), to gain additional control of the shape of the write bubble.

Figure 2:
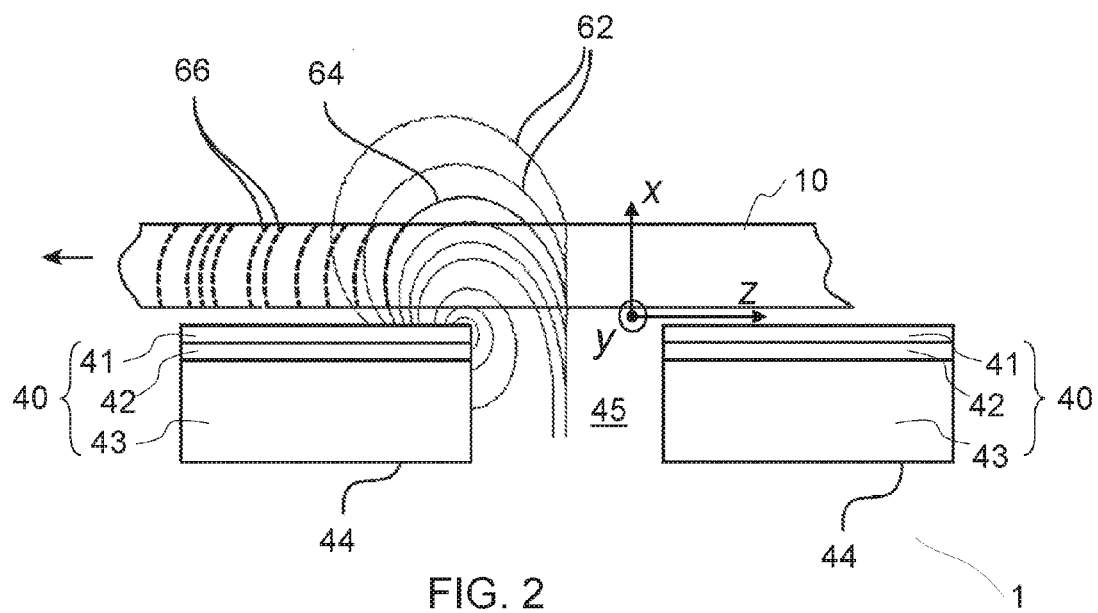
FIG. 2 is a 2D cross-sectional view of layered write pole elements on either side of a write gap, as involved in embodiments.
Figure 3:
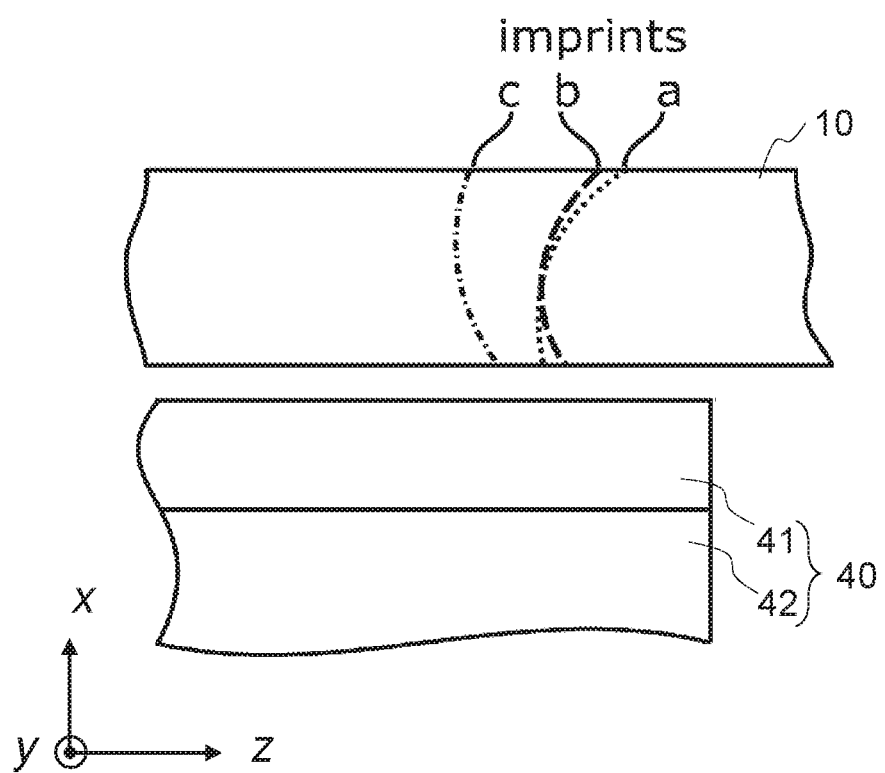
FIG. 3 is a 2D cross-sectional view about the pole corner of a write pole element as shown in FIG. 2, as involved in embodiments.

Importantly, the layer structure 41-43 here concerns the write pole (e.g., the elements 44 of the top pole that are directly adjacent to the write gap 45 [see FIG. 1, 2], as opposed to the return pole, not shown). In addition, the stacking direction x of this layer structure 41-43 need be perpendicular to the plane of the media 10 (or the contact plane (y, z), as depicted in FIGS. 2-3, and not along an axis parallel to the plane of the media 10.

In particular, the write pole 40 of a transducer 30 may comprise at least two write gaps 45 (as assumed in FIG. 1) and elements 44 on either side of each of the write gaps 45 may be layered, so as for each element 44 to exhibit two or more superimposed layers 41-43 of distinct materials, having distinct magnetic properties as described above.

In variants, only a subset of the various top pole elements 44 may be multi-layered, which would already allow for additional control of the shape of the write bubble. This, however, would complicate the fabrication process.

Note that other write gap patterns than the "/\" (as assumed in the accompanying drawings) may be used. In particular, the so-called N pattern ("/\/") may be used, as well as other multi-gap designs as used for writing high density servo patterns.

The saturation magnetization of each of two layers of the set, e.g., layers 41 and 42 in FIGS. 2-3, is chosen to be between 1.0 to 2.3 Tesla, i.e., the selected interval is [1.0 T, 2.3 T]. This range covers a class of magnetic materials of interest in the present context. Now, the contrast between the (average) saturation magnetizations of said two material layers 41, 42 need be between 32% and 130% (the interval is [32%, 130%]), in order to add additional control on the shape of the write bubble. The lower boundary (32%) corresponds to the minimal contrast needed to observe significant improvement to the write bubble shape. The largest boundary approximately corresponds to the maximal contrast that can be obtained with the materials of interest, which have a saturation magnetization falling in the above interval [1.0 T, 2.3 T].

The contrast in percent is defined as $100 \times (B_{s,max}/B_{s,min} - 1)$, where $B_{s,max}$ and $B_{s,min}$ respectively denote the largest one and the smallest one of the saturation magnetizations for the two layers 41, 42. These two layers are preferably contiguous layers, e.g., the topmost layers of each element 44 of the write (top) pole 40, whereby layer 41 comes into direct contact with the magnetic tape 10, in operation (as assumed in FIGS. 2-3). Average saturation magnetizations are considered.

Note that the saturation magnetization is, to a reasonable accuracy, linked to the composition of the magnetic compound (e.g., $B_s=1.56\pm0.05$ Tesla for $Ni_{45}Fe_{55}$), as well documented in the literature. Thus, the value of $B_s$ can be inferred from the composition of, e.g., a sputter target used to deposit the thin magnetic film and, this, accurately enough for the present purpose. In addition, techniques are known, which may be used for measuring $B_s$. For instance, a conventional technique is the so-called vibrating sample magnetometry.

As further illustrated in FIGS. 2 and 3, the above layer structure provides a means for controlling the shape of the write bubble 64 (and therefore the imprinted transition walls 66) other than via the magnitude of the drive current. In FIG. 2, equal magnitude contours of the write field are denoted by numeral reference 62. Reference 64 denotes a write bubble contour, giving rise to imprinted transition walls 66.

Experiments and simulations conducted by the present inventors have shown that a proper choice of the materials (and possibly their thicknesses) of the individual layers 41-43 of the write poles 40, 44, makes it possible to influence the size and shape of the write bubble 64 (as illustrated in FIG. 3). In this way, additional latitude is gained to optimize the imprinted transitions 66 and therefore the write quality. A measurable optimization can already be achieved with as few as two layers 41, 42 (as assumed in FIG. 3). Yet, three or more layers of materials having distinct magnetic properties may be contemplated, in more sophisticated variants.

Note that the desired effect can be obtained even if there is no contrast in the relative permeability (only in the saturation magnetizations) of the layers 41, 42. From theoretical considerations and simulations, one may expect that the contrast in the saturation magnetizations will already allow for additional control even if the relative permeabilities are the same, though the relative permeabilities may be optimized as well, in theory. However, experimental measurements of relative permeabilities are extremely difficult in the present context (a patterned film in the write head, as opposed to a bulk). In practice, once the materials have been chosen based on their desired saturation magnetization, the fabrication process and the final geometry obtained for the layers 41, 42 give rise to certain permeabilities for the layers 41, 42, which are not (or hardly) experimentally measurable. Thus, the different magnetic properties sought for the various layers 41, 42 are here expressed in terms of their saturation magnetizations.

Simulations have shown that promising results can notably be obtained for a contrast in the range of [32%, 52%], and more especially in the range of [38%, 47%]. In particular, good results have been experimentally obtained for contrasts between 39.5 and 44.5%.

The thickness of each of the layers 41-43 can be optimized as well. It is preferably between 5 nm and 40 microns, and more preferably between 100 nm and 4 microns, owing to constraints on the fabrication process. Now, although the thicknesses of the layers shall preferably be optimized, additional control on the write bubble shape can already be achieved with layers having a same thickness, owing to their distinct saturation magnetization.

In embodiments, the distinct materials of layers 41-43 are chosen among NiFe, CoFe, CoFeNi, CoFePt, CoFeN, and NiFeN. In particular, promising results have been obtained using NiFe and CoFe. As an example, the topmost layer 41 may comprise CoFe and have a thickness equal to 300±100 nm, while the thickness of the contiguous layer 42 (NiFe) is equal to 1200±200 nm.

For illustration purposes, FIG. 3 compares calculated imprints as obtained for various compositions of a bi-layered write pole 40, all the other parameters being fixed. The imprint "a" reflects a reference case where both layers 41, 42 comprise a same material, i.e., a single layer of NiFe. A less inclined (or curved) imprint "b" can be obtained by using NiFe for layer 42 and CoFe for layer 41 (as in embodiments described herein). The imprint "c" obtained by reversing the materials compositions for layers 41 and 42 is even straighter (as in other embodiments described herein).

An additional benefit of the above layering is to lower (or even suppress) skin effects and thereby improve on ringing and switching rise time. This is useful for large yoke lengths, as seen, e.g., in planar servo writers. This suggests to subdivide the full thickness of the write pole into a larger number of layers.

Concerning the fabrication, any suitable thin-film deposition technique may be relied upon, in particular, methods relying on thin-film deposition steps (such as electroplating, or sputter deposition, depending on the material to be deposited) may be inserted into the fabrication sequence for conventional single-layer-pole writers.

Layered write poles as described above may be used in a tape head as shown in FIG. 1. The tape head of FIG. 1 has a step-like cross-sectional profile in the plane (x, z), so as to exhibit two treads 20, 24, each extending essentially parallel to the plane (y, z), with a riser 22 in-between. The riser extends essentially parallel to the plane (x, y). The treads 20, 24 are respectively formed by a tape-bearing surface 20 and a recessed surface 34, the latter located on, e.g., the side of the trailing edge $e_t$ of the tape-bearing surface 20, the leading edge being denoted by $e_l$.

The tape-bearing surface 20 is preferably essentially flat, to minimize the distance between the write transducer 30 and the tape 10, in operation. The surface 20 comprises at least one transducer 30. Still, the tape-bearing surface 20 may typically include several other transducers (not shown). The tape-bearing surface 20 is preferably planar, i.e., it comprises one or more in-plane transducers 30, each embedded in the surface 20 so as to be essentially level therewith, as in planar tape heads (known per se).

Providing a step-like structure allows to effectively decrease the area of the tape head that comes into contact with the tape 10, as only the area 20 touches the tape 10, in operation. In addition, another recessed portion may be provided upstream, on the leading edge $e_l$. A preferred intended operation of present tape write heads is with a positive leading wrap angle α and a negative trailing wrap angle β, and unidirectional.

A tape head 1 as described herein is preferably a planar servo write head, i.e., a planar head comprising at least one, in-plane transducer (writer) 30, whose top poles are essentially level (i.e., front-flush) with the tape bearing surface 20. It shall typically include other components such as a coil, side yokes, back yokes and embedding dielectric materials, as usual (not shown). Present tape heads can notably be used in tape head apparatuses for recording or reproducing multi-track tapes. Accordingly, an embodiment may be provided as an apparatus.

In certain embodiments, said contrast is between 32% and 52%, or even between 38% and 47%. In particularly preferred embodiments, the contrast is between 39.5 and 44.5%.

In the embodiments described herein, the tape head may for instance be a planar tape head, where said transducer is an in-plane transducer. It is for example a servo writer.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. In particular, other materials than those explicitly mentioned may be used, provided they lead to the desired magnetic contrast.

What is claimed is:

1. A tape head, configured to contact a magnetic tape, at the level of a contact plane, for writing to the tape, in operation, the tape head comprising:
   a transducer, the latter being a write element, configured to write to the magnetic tape, in operation, the transducer comprising:
      a layered write pole, the latter comprising a set of two or more superimposed layers of distinct materials, the layers superimposed in a direction perpendicular to the contact plane, wherein:
         a saturation magnetization of each of two material layers of the set is between 1.0 to 2.3 Tesla; and
         a contrast between the saturation magnetizations of said two material layers of the set is between 32% and 130%, the contrast defined as $100 \times (B_{s,max}/B_{s,min} - 1)$, where $B_{s,max}$ and $B_{s,min}$ respectively denote a largest one and the smallest one of the saturation magnetizations of said two material layers of the set.

2. The tape head of claim 1, wherein said contrast is between 32% and 52%.

3. The tape head of claim 1, wherein said contrast is between 38% and 47%.

4. The tape head of claim 3, wherein a thickness of each of said two material layers is between 5 nm and 40 microns.

5. The tape head of claim 4, wherein the thickness of each of said two material layers is between 100 nm and 4 microns.

6. The tape head of claim 5, wherein said two or more superimposed layers are contiguous layers.

7. The tape head of claim 6, wherein said two or more superimposed layers are topmost layers of the layered write pole, whereby one of said two or more superimposed layers comes into direct contact with said magnetic tape, in operation.

8. The tape head of claim 1, wherein said contrast is between 39.5 and 44.5%.

9. The tape head of claim 1, wherein said write pole comprises at least two write gaps and elements on either side of each of the write gaps, wherein each of said elements is layered, so as to exhibit, each, two or more superimposed layers of distinct materials similar to said set of two or more superimposed layers.

10. The tape head of claim 1, wherein
the distinct materials of the two or more superimposed layers are, each, chosen among the following set of materials: NiFe, CoFe, CoFeNi, CoFePt, CoFeN, and NiFeN.

11. The tape head of claim 10, wherein
one of the two or more layers comprises NiFe, and the other one of said two or more layers comprises CoFe.

12. The tape head of claim 11, wherein
said other one of the two or more layers that comprises CoFe is layered on top of said one of said two or more layers.

13. The tape head of claim 12, wherein
the thickness of each of said two material layers is between 100 nm and 4 microns.

14. The tape head of claim 12, wherein
the thickness of said other one of the two or more layers that comprises CoFe is equal to 300±100 nm, and the thickness of said one of the two or more layers is equal to 1200±200 nm.

15. The tape head of claim 1, wherein
the tape head is a planar tape head, said transducer comprising one or more layered write poles that are essentially level with the tape-bearing surface.

16. The tape head of claim 15, wherein
the tape head is a servo writer.

17. A tape head apparatus for recording or reproducing multi-track tapes, comprising the tape head of claim 1.

* * * * *